Figure 8:
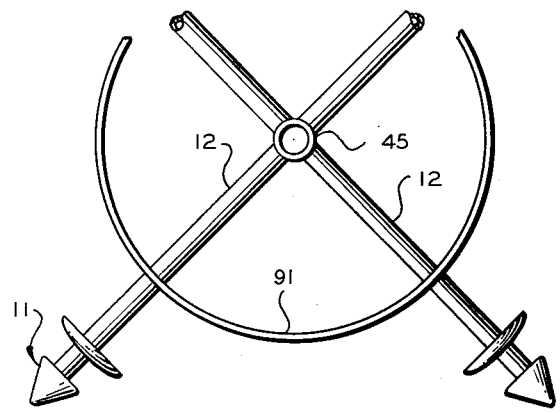

March 20, 1962   A. W. PECK   3,025,806
APPARATUS FOR INJECTING FLUID INTO SOIL
Filed Dec. 11, 1958   4 Sheets-Sheet 1
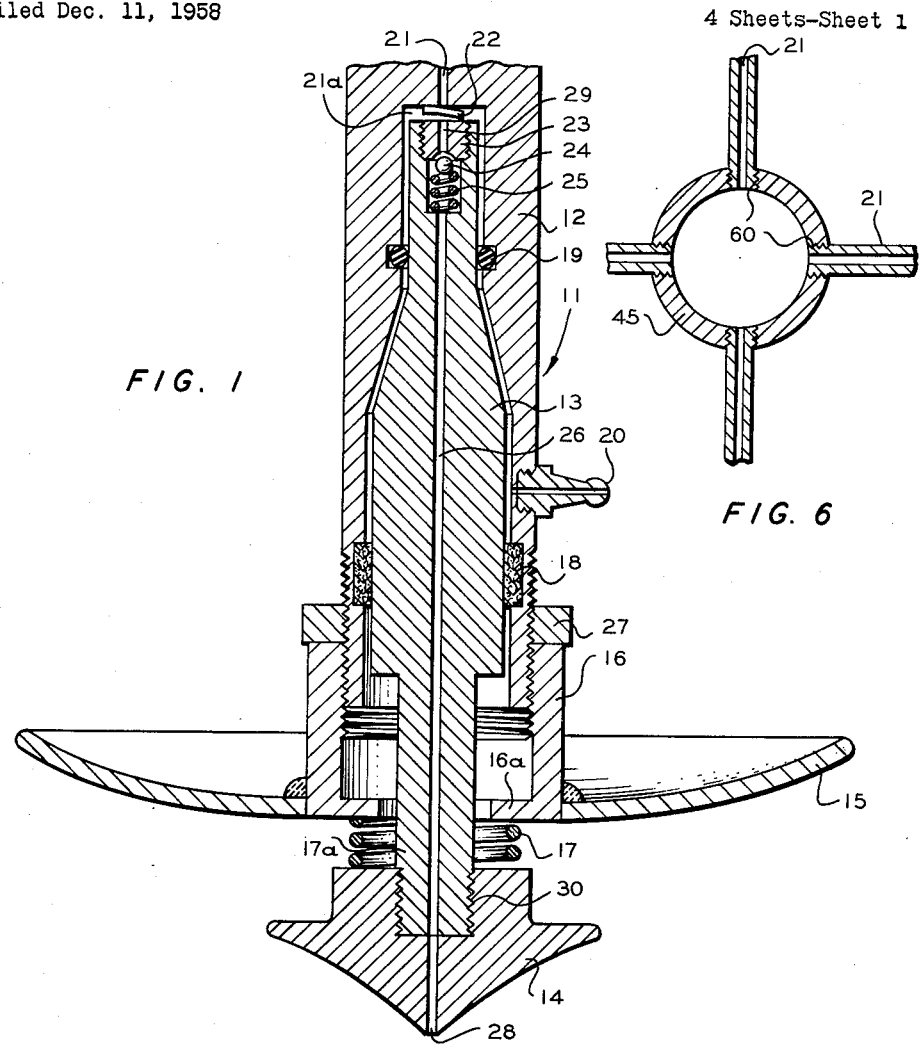
FIG. 1
FIG. 6
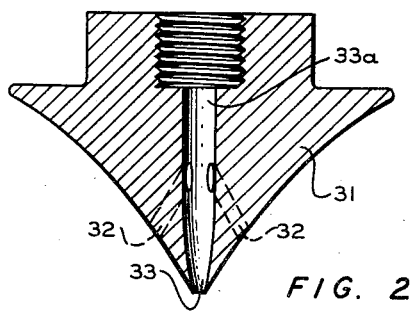
FIG. 2
INVENTOR.
A.W. PECK
BY
ATTORNEYS

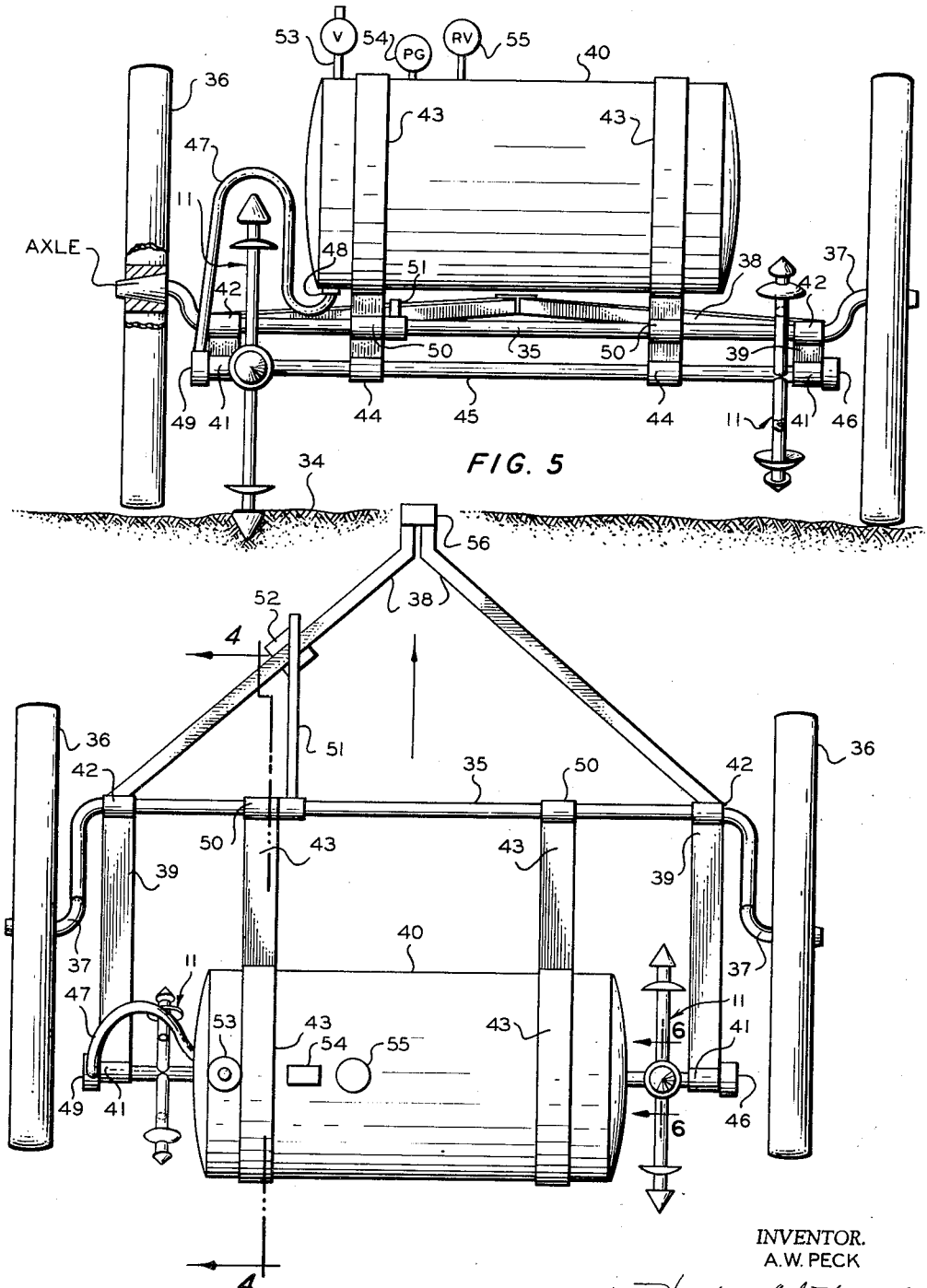

United States Patent Office 3,025,806
Patented Mar. 20, 1962

3,025,806
APPARATUS FOR INJECTING FLUID INTO SOIL
Alvin W. Peck, Bartlesville, Okla., assignor to Phillips Petroleum Company, a corporation of Delaware
Filed Dec. 11, 1958, Ser. No. 779,678
5 Claims. (Cl. 111—6)

This invention relates to apparatus for injecting fluid into soil.

An object of this invention is to provide an apparatus for injecting fluid into soil. Another object of this invention is to provide apparatus for injecting fluid into soil without disturbing roots of growing crop plants. Yet another object of this invention is to provide an apparatus for spot injecting fluid into hard and compacted soils as well as into loose soils. Still another object is to provide apparatus for injecting fluid into soil without need for drawing a knife blade or plow through the soil at a desired injection depth. Still other objects and advantages will be realized upon reading the following description which, taken with the attached drawing, respectively describes and illustrates preferred embodiments of my invention.

I have devised an apparatus which is adapted for spot injection of fluids, such as liquid fertilizers, into soils with injection nozzles which are pressured into the soil by the weight of the vehicle carrying the fertilizer supply tank and the injection equipment. The injection equipment is a plurality of piston and cylinder combinations so arranged radially around an axial manifold that as the machine is drawn forward injection nozzles contact the soil and upon each contact a quantity of the fluid is injected into the soil. The injection nozzle is forceably contacted with the soil by the weight of the equipment.

This apparatus is intended to serve for the distribution or injection of such fertilizer materials as anhydrous ammonia, aqua ammonia, other nitrogen-containing solutions such as aqueous ammonium sulfate, aqueous ammonium nitrate, aqueous ammonium phosphate, and soil fumigants and conditioners.

When these injection nozzles or pumps of my invention are disposed radially around an axial manifold, for example, as four injection pumps disposed at 90 degree intervals around the axial manifold, and are about 1½ foot long each, upon rotating such an apparatus by drawing the equipment in a forward direction, injection points are approximately 20 inches apart. I prefer to employ two such sets of injection pumps and to have the pumps in each set staggered with respect to one another so that upon drawing the vehicle forward, one of the injection pumps will always be touching the ground and causing the injection apparatus to rotate. The machine is so constructed that the axial manifold is bearinged to carry the implement load so that ample weight will be available for impressing the injection nozzles or pumps against soil which is hard and compacted. The injector nozzles or tips have sufficient area for contacting with the soil to pack the soil in such a manner that fluid, once injected into the soil, will not become lost from the soil by evaporation. The opening or conduit through the injector tips is sufficiently small that the fluid is injected into the soil at a very high velocity.

Figure 4:
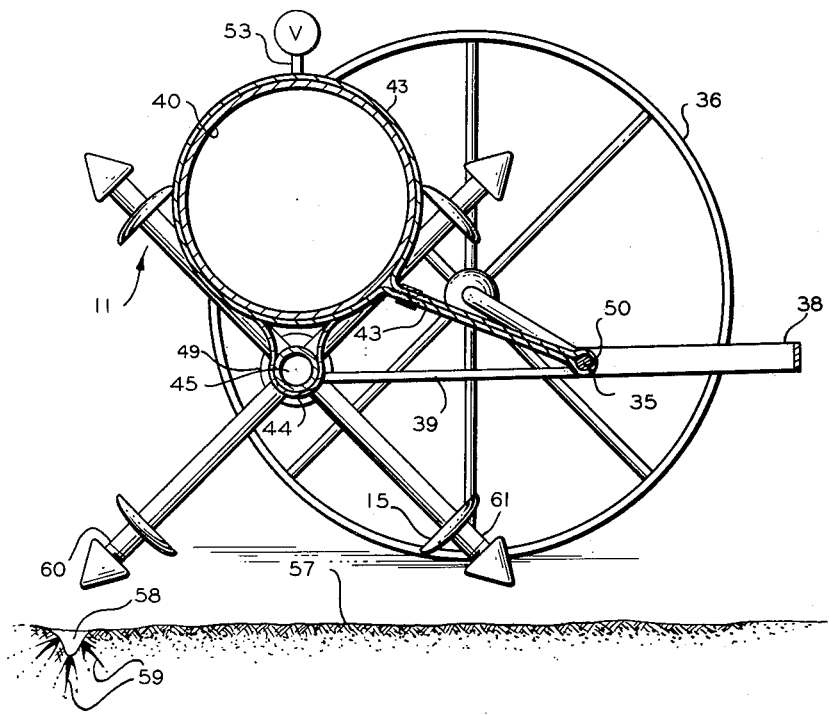
Figure 7:
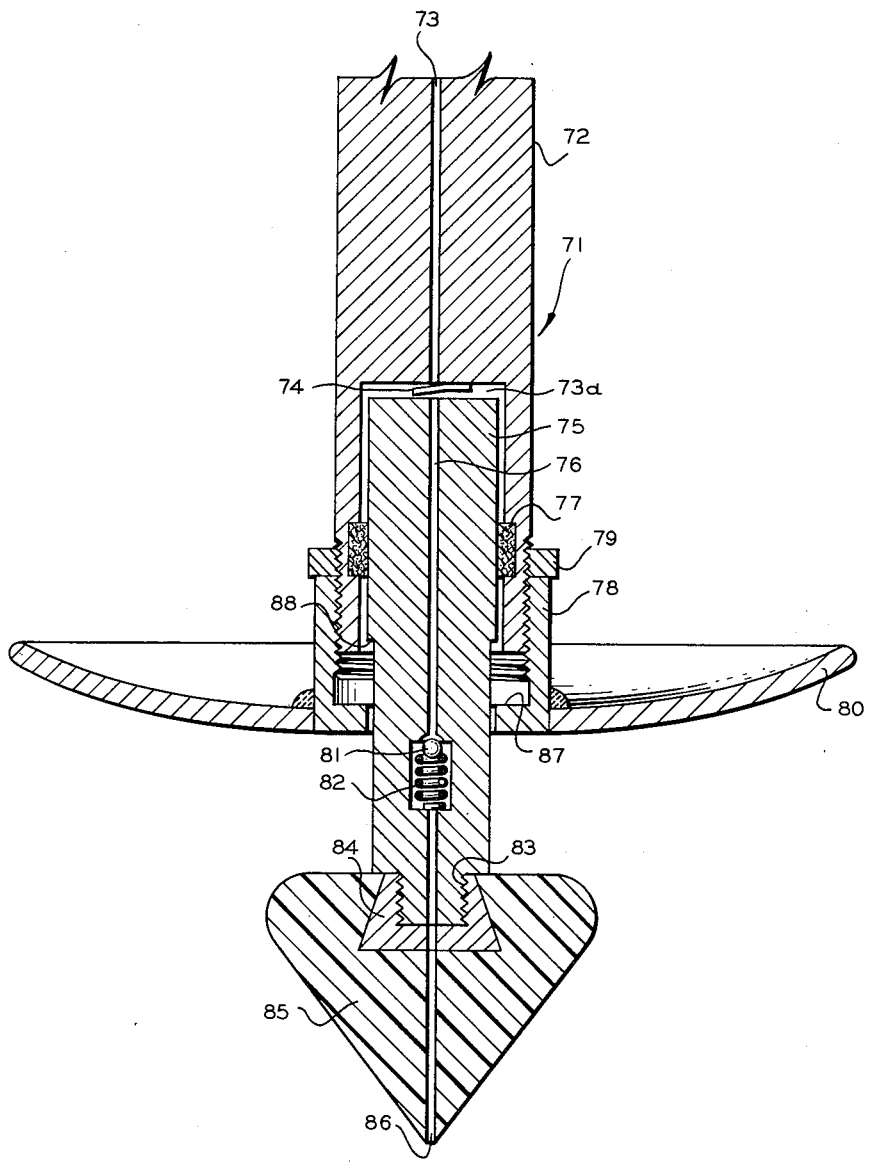

In the drawing, FIGURE 1 is a longitudinal view, partly in section, of one embodiment of my apparatus. FIGURE 2 is a sectional view of a second embodiment of a portion of the apparatus of FIGURE 1. FIGURE 3 is a plan view of an implement-mounted spot injection apparatus of my invention. FIGURE 4 is a sectional view, taken along the line 4—4 of FIGURE 3. FIGURE 5 is a rear elevational view of the apparatus of FIGURE 3. FIGURE 6 is a sectional view, on an enlarged scale, taken on the line 6—6 of FIGURE 3. FIGURE 7 is another embodiment of injection apparatus of my invention. FIGURE 8 illustrates an assembly of injectors reinforced by a support ring.

Referring to FIGURE 1 of the drawing, reference numeral 11 identifies one embodiment of injector assembly in which a cylinder 12 houses a piston 13 on the lower end of which is disposed a pressure foot or injection nozzle 14. The cylinder is provided with a groove in which is disposed an O-ring seal 19 so disposed as to provide against fluid leakage between the piston and the cylinder. A chevron packing 18 is disposed in a groove in the cylinder wall around the large diameter end of the piston. A grease fitting 20 is provided, as illustrated, for introduction of grease for lubrication of the piston. The chevron packing 18 and the O-ring 19 prevent escape of the lubricant. The lower, outer surface of the cylinder 12 is threaded for accommodation of a threaded annular adjustable nut 16. A lock nut 27 is provided for preventing further threading or unthreading of nut 16 by vibration of the apparatus. A load bearing disc 15 is welded to the adjustable nut 16 and serves the purpose of preventing the injection nozzle from being thrust too great a distance into the ground when operating on loose and friable soil. A compression spring 17 surrounds a small diameter extension 17a of piston 13 as illustrated. This compression spring tends to move the piston downward as illustrated in FIGURE 1. FIGURE 6 illustrates one method of attaching this injection apparatus to a manifold tubing, as will be described hereinafter. As illustrated in FIGURE 6, there are four such injection assemblies as illustrated in FIGURE 1 disposed at approximately 90 degree intervals around a manifold 45. A conduit 21 communicates with the manifold in such a manner that fluid to be injected into the soil flows from the manifold 45 through conduit 21 and a check valve 22 into a space 21a within the cylinder 12 of my apparatus. Compression spring 17 tends to move piston 13 downward and upon movement of piston 13 downward, space 21a in the cylinder becomes filled with fluid to be injected subsequently into the soil. A check valve ball 24 is pressured into sealing relation with its seat by a compression spring 25 of such strength that upon filling space 21a with liquid ammonia, the ammonia cannot pass the check valve 24. A plug 23 provided with a conduit 29 retains the ball valve in place. The end of the plug adjacent the valve ball serves as a valve seat. A conduit 26 communicates space 21a with a conduit 28 in the injection nozzle 14.

This apparatus operates in the following manner. As the injector assembly 11 rotates with the manifold and the injection nozzle contacts the surface of the ground, spring 17 is compressed and piston 13 is moved upward in such a manner that check valve 22 closes and fluid previously admitted into space 21a is forced through conduit 29 around the ball check valve 24, through conduit 26 and through the injection conduit or nozzle 28 into the soil. As the vehicle moves, the pressure foot 14 is lifted from its contact with the soil. At this time compression spring 17 moves piston 13 downward again, which movement increases the volume of space 21a thereby refilling the space with fluid for another injection operation.

The load bearing disc 15 is provided in such a manner that when operating in soft and loose ground, the disc prevents the pressure foot from being forced too far into the soil.

The adjustable nut 16 is provided with a shoulder 16a which operates as a stop for downward movement of piston 13 and as a support for spring 17. In other words, regulation of the position of the adjuster nut 16 determines the volume of fluid entering space 21a for each injection into the soil. If a larger volume of fluid is desired to be injected into the soil, nut 16 is lowered with respect to the cylinder 12 while if a smaller volume of fluid is desired, nut 16 is threaded farther on the cylinder 12.

In FIGURE 2 is illustrated an alternate embodiment of pressure foot or injection nozzle suitable for use with the injector of FIGURE 1. To use the pressure foot 31 of FIGURE 2 it is merely necessary to unthread pressure foot 14 at threads 30 and substitute the pressure foot 31 therefor. The difference between pressure foot 31 and pressure foot 14 is that pressure foot 31 is provided with more than one conduit or nozzle 32. Conduits 32 along with conduit 33 assist in spreading of the added fertilizer more rapidly than when using the pressure foot 14 of FIGURE 1 with its single nozzle 28. In FIGURE 2 conduits 32 and 33 are of smaller diameter than conduit 33a in order to obtain a nozzle effect on the injection of liquid from conduit 33a through the distributor nozzle.

FIGURES 3, 4, and 5 show respectively a plan view, a sectional view taken on the line 4—4 of FIGURE 3, and a rear elevational view, of a vehicle provided with the injector apparatus of my invention. In these FIGURES a hitch frame 38 is provided with a hitch connection 56 for attachment to a tractor or other source of motive power. Frame 38 is provided with bearings 42 through which extends a support axle 35. This support axle is of the offset type in that either end is provided with an offset axle 37 upon which is mounted wheel 36. To bearings 42 are attached support members 39 provided with bearings 41 at the ends opposite bearings 42. The manifold tubular shaft 45 is supported by bearings 41, one end of the shaft being closed by a cap 46 and the other end being provided with a swivel joint 49. A tank 40 is mounted on the vehicle in such a manner that tank support straps 43 extend around the tank in a conventional manner to bearings 44 and to bearings 50. Bearings 50 are rotatably mounted on support axle 35 while the tank straps 43 are attached to the bearings 50 in any suitable manner so that upon rotation of support axle 35 the tank straps 43 and tank do not rotate. The tank straps 43 extend around bearings 44 which are supported by the tubular manifold shaft 45. This tubular manifold shaft 45 is intended to support the main portion of the weight of tank 40 and its contents. As illustrated in FIGURES 3, 4, and 5, there are four injection assemblies 11 mounted with respect to the manifold tubular shaft as spokes of a wheel. There are two of such injector assembly wheels. The injector assemblies 11 are mounted on the shafts at 90 degree spacing. However, the injector assemblies 11 at the right hand end of the shaft are staggered with respect to those at the left hand end of the shaft so that as the vehicle moves forward an injector assembly injects fertilizer into the ground each 45 degree of rotation of the tubular manifold shaft.

A flexible tube 47 communicates swivel joint 49 with a valved connection 48 in the bottom of tank 40. The tank is provided with a pressure gauge 54, a relief valve 55, and a filling connection 53.

When the apparatus is to be employed for its intended use, hitch 56 is attached to a tractor or other source of motive power and upon arriving at the field a wheel raising lever 51 is lowered and latched in a lowered position by a lever latch 52 to hold the wheels 36 in elevated positions off the ground. This lever 51 is intended to raise the wheels sufficiently so that the pressure feet of the injector assembly touch the ground as the vehicle is drawn forward. Conversely, when the vehicle is to be moved from one location to another, it is merely necessary to unlatch lever 51 and raise same, which movement rotates the support axle 35 to lower the wheels 36 to the ground, thereby raising the injector assemblies sufficiently far from the ground that upon movement of the vehicle the injector assemblies do not touch the ground. The lever latch 52 is sufficiently long and is of the form of the arc of the circle, the center of which is the center line of support axle 35 so that the lever 51 can be latched in either a raised or lowered position.

In FIGURE 4 the apparatus is illustrated as being in use wherein the surface of the ground to be fertilized is represented by reference numeral 57. The injector nozzle 60 has just injected a charge of fertilizer into the ground, reference numeral 58 identifying the imprint of the pressure foot 14 and reference numeral 59 identifying injected liquid. Since injector nozzle 60 is approximately 45 degrees from vertical the injector nozzle at the other end of the tubular manifold shaft 45 is substantially vertical and is contacting the ground. As soon as this other injection nozzle has been moved out of vertical, injector nozzle 61 of FIGURE 4 then is in condition to contact the ground and inject its charge of fertilizer into the ground.

FIGURE 6 is the sectional view on the line 6—6 of FIGURE 3 of an enlarged scale. This FIGURE is intended to show one means of attachment of conduits 21 of the injector assemblies 11 to the tubular manifold shaft 45. As illustrated in FIGURE 6, the conduits 21 are threaded into the tubular shaft 45. Other suitable means of attachment can, if desired, be employed in place of the threading.

FIGURE 7 illustrates a second embodiment of injector assembly which is used in place of the injector assembly 11 of FIGURE 1, if desired. The injector assembly is identified broadly by reference numeral 71. This assembly comprises a heavy walled tubular member 72 provided with a conduit 73 which opens into a cylinder 73a. A piston 75 is fitted into the cylinder slidably with a packing, for example a chevron type packing 77 disposed to prevent leakage between the outer walls of the piston and the inner walls of the cylinder. The end of conduit 73 adjacent the piston is provided with the flapper check valve 74 which is intended to allow flow of fluid through conduit 73 into the cylinder 73a but does not permit reverse flow. Piston 75 is provided with an axial conduit 76. An enlarged space in conduit 76 is provided with a ball check valve 81 which is maintained normally in a seated position by a compression spring 82. The wall of conduit 76 adjacent the ball serves as the seat for the valve. The lower end of piston 75 has a somewhat smaller diameter than the upper end thereof so as to provide a shoulder 88. On the lower end of the wall of the member 72 is threaded an adjuster nut 78. A lock nut 79 is provided for locking nut 78 against movement. A shoulder 87 is provided on the lower end of the adjustor nut 78 in such a manner that shoulder 88 of piston on moving downward is restrained against further movement upon contact with the shoulder 87. A pressure foot 85 is molded with a metal insert 84 having interior threads 83 as illustrated. The lower end of the piston 75 is threaded into the metal insert 84. Pressure foot 85 is provided with an injection conduit or nozzle 86. A load bearing disc 80 is attached, as by welding, to the lower outer periphery of the adjuster nut 78. This load bearing disc is intended to prevent the injection nozzle from entering the soil to too great a distance in case the soil is very loose.

In the operation of the embodiment of injector assembly illustrated in FIGURE 7, it will be noted that this injector assembly is not provided with a compression spring for moving the piston and pressure foot members away from check valve 74. When liquid anhydrous ammonia is being injected into the soil, this material exerts a considerable vapor pressure even at atmospheric temperature and this liquid upon being present in conduit 73 and cylinder 73a exerts a considerable pressure against the upper face of piston 75 and the piston is thus forced downward, which permits filling of the space 73a with a new charge of ammonia. As this assembly rotates around the circle and pressure foot 85 is in position again to contact the ground, the cylinder 73a is filled with ammonia, and upon contacting the ground with pressure foot 85 the piston assembly is raised upward, which movement forces the liquid ammonia past the check valve 81 against the compression of spring 82. As the vehicle is moving forward at reasonably rapid speed, this injection step is quite rapid; and because the diameter of the injection nozzle 86 is relatively small, the charge of ammonia exists through nozzle 86 at a high velocity, which velocity forces the ammonia into the soil.

In FIGURE 8 is illustrated an alternate embodiment of an injector assembly around the manifold tubular shaft 45. In such an embodiment it is not necessary to employ the load bearing disc 15 of FIGURE 1 or the load bearing disc 80 of FIGURE 7. In place of these load bearing discs, a rim 91 resembling the rim of a wheel is positioned as illustrated. This rim reinforces the positioning of the injector nozzle assemblies 11 and is sufficiently rigid that it supports the weight of the apparatus in case the injector assembly 11 tends to sink deeply into the ground.

The nozzle 28 of FIGURE 1, 32 and 33 of FIGURE 2, and 86 of FIGURE 7 are of relatively small diameter so that the liquid injected through these nozzles will pass therethrough at a relatively high velocity for impingement in the ground. The diameters of these nozzles will, of course, be dependent upon the volume of liquid to be injected into the ground. The diameters may arrange from around 1/64 inch to about 1/8 inch. Preferred diameters are from about 1/16 to about 1/32 of an inch for anhydrous ammonia. In the embodiment illustrated in FIGURE 2 it is obvious that the nozzle conduits 32 and 33 must be smaller in diameter than the diameter of nozzle 28 of FIGURE 1 and of nozzle 86 of FIGURE 7, because in the case of FIGURE 2 the ammonia flows from conduit 33a through several conduits 32, 33 into the ground. In order to maintain the high velocity the diameters of the nozzles 32 and 33 must be relatively small in comparison to the diameter of conduit 33a.

In case aqueous ammonia is injected into the ground, the nozzle conduits are somewhat larger than when anhydrous liquid ammonia is injected because the concentration of the ammonia in the water or the concentration of ammonia per cubic inch is considerably less in the case of aqueous ammonia than in the case of anhydrous ammonia.

My ammonia injection equipment has the particular advantage that it can be used for the injection of ammonia into the soil without disturbing the roots of growing crops. This advantage is true because there is no knife or plow blade being drawn through the soil at a depth at which it is intended to inject the ammonia.

In addition to anhydrous or aqueous ammonia, this apparatus is adapted for the injection of aqueous solution of nitrogen compounds, for example ammonium nitrate, aqueous solution of ammonium sulfate, and aqueous solutions of ammonium phosphate. Furthermore, such materials as soil fumigants and other materials as needed can be injected into the ground.

The injector pads or tips as illustrated in FIGURES 1 and 7 have sufficient contact with the soil that the soil is packed outwardly from the tip of the cone of the pad, and ammonia once injected into the soil does not easily evaporate therefrom. Furthermore, the openings through the pressure feet are sufficiently small that ammonia is injected at a very high velocity and enters the soil to an appreciable depth.

The use of my apparatus does not require a great deal of power for its operation. It is merely necessary to draw the implement forward and as the two circles of injector assemblies rotate the ammonia is injected in a staggered pattern into the ground.

Materials of construction of the apparatus disclosed herein are selected from those commercially available, taking into account the corrosive nature of any of the materials handled.

The piston 75 in FIGURE 7 and the piston 13 in FIGURE 1 can, if desired, be constructed of a plastic material, such as a firm polyethylene.

While certain embodiments of the invention have been described for illustrative purposes, the invention obviously is not limited thereto.

I claim:
1. An implement-mounted dispensing system for application of fluid to soil comprising, in combination, a wheeled vehicle having a frame, a rigid tubular member supported transversely and rotatably by said frame, a fluid supply tank supported by said frame, a tubular member communicating said tank with said rigid tubular member, a plurality of fluid injection members supported by and disposed at spaced intervals circumferentially around said rigid tubular member, the longitudinal axes of said injection members being normal to the axis of said rigid tubular member, each injection member comprising, in combination, a cylinder having one end closed and the other end open, a piston slidably fitting said cylinder, a first conduit through the closed end of said cylinder, a check valve in said first conduit to allow fluid flow only into said cylinder, an extension on the end of said piston opposite said check valve and extending beyond the open end of said cylinder, said extension having a smaller diameter than the diameter of said piston so as to provide an annular shoulder facing away from said check valve, a second conduit extending through said piston and said extension, said second conduit being disposed to communicate with said first conduit, a check valve in said second conduit being so disposed as to permit fluid flow only in the direction from said first conduit, an annular member axially adjustably supported by the cylinder at its open end, said annular member having an inner diameter less than the outer diameter of said annular shoulder and surrounding said extension, the axially adjustable annular member being adapted by its position with respect to said cylinder to limit the extent of axial movement of said piston thereby regulating the volume of fluid displaced per stroke of said piston for injection into soil through a third conduit subsequently defined, an injection nozzle having one end pointed and its other end removably fixed to the end of said extension on the side of said annular member opposite said shoulder, a third conduit through said nozzle, said third conduit, heretofore mentioned, being in communication with said second conduit, and said annular member having an outer diameter greater than the maximum diameter of the nozzle whereby the depth to which said nozzle can be injected into the soil is defined.

2. An implement-mounted dispensing system for application of fluid to soil comprising, in combination, a wheeled vehicle having a frame and being adapted to travel on the ground, the wheels being mounted rotatably on an offset axle, said frame being supported by said axle, said axle being rotatable with respect to said frame, means for rotating said axle whereby said wheels are lifted off the ground, one end of said frame being adapted for connection to a prime mover, a rigid tubular member supported transversely and rotatably by said frame, a fluid supply tank supported by said frame, a tubular member communicating said tank with said rigid tubular member, a plurality of fluid injection members supported by and disposed at spaced intervals circumferentially around said rigid tubular member, the longitudinal axes of said injection members being normal to the axis of said rigid tubular member, each injection member comprising, in combination, a cylinder having one end closed and the other end open, a piston slidably fitting said cylinder, a first conduit through the closed end of said cylinder, a check valve in said first conduit to allow fluid flow only into said cylinder, an extension on the end of said piston opposite said check valve and extending beyond the open end of said cylinder, said extension having a smaller diameter than the diameter of said piston so as to provide an annular shoulder facing away from said check valve, a second conduit extending through said piston and said extension, said second conduit being disposed to communicate with said first conduit, a check valve in said second conduit being so disposed as to permit fluid flow only in the direction from said first conduit, an annular member adjustably supported by the outer wall of the cylinder at its open end, said annular member having an inner diameter less than the outer diameter of said annular shoulder and surrounding said extension, said annular member being adapted to limit the extent of axial movement of said piston thereby regulating the volume of fluid displaced per stroke of said piston for injection into soil through a third conduit subsequently defined, an injection nozzle having one end pointed and its other end removably fixed to the end of said extension on the side of said annular member opposite said shoulder, a third conduit through said nozzle, said third conduit, heretofore mentioned, being in communication with said second conduit, and said annular member having an outer diameter greater than the maximum diameter of the nozzle whereby the depth to which said nozzle can be injected into the soil is defined.

3. An injector assembly for injecting fluid into soil comprising, in combination, a cylinder having one end closed and the other end open, a piston slidably fitting said cylinder, a first conduit through the closed end of said cylinder, a check valve in said first conduit to allow fluid flow only into said cylinder, an extension on the end of said piston opposite said check valve and extending beyond the open end of said cylinder, said extension having a smaller diameter than the diameter of said piston so as to provide an annular shoulder facing away from said check valve, a second conduit extending through said piston and said extension, said second conduit being disposed to communicate with said first conduit, a check valve in said second conduit being so disposed as to permit fluid flow only in the direction from said first conduit, an annular member axially adjustably supported by the cylinder at its open end, said annular member having an inner diameter less than the outer diameter of said annular shoulder and surrounding said extension, said axially adjustable annular member being adapted by its position with respect to said cylinder to limit the extent to axial movement of said piston thereby regulating the volume of fluid displaced per stroke of said piston for injection into soil through a third conduit subsequently defined, an injection nozzle having one end pointed and its other end removably fixed to the end of said extension on the side of said annular member opposite said shoulder, a third conduit, heretofore mentioned, through said nozzle, said third conduit being in communication with said second conduit, and said annular member having an outer diameter greater than the maximum diameter of the nozzle whereby the depth to which said nozzle can be injected into the soil is defined.

4. An injector assembly for injecting fluid into soil comprising, in combination, a cylinder having one end closed, one end open and a uniform diameter throughout its length, a piston slidably fitting said cylinder, first and second conduits through the closed end of said cylinder and through said piston respectively, first and second check valves being positioned in said first and second conduits, respectively, in such a manner as to permit fluid flow through said first conduit only into said cylinder and through said second conduit only from said cylinder, an axial extension on the end of said piston nearest the open end of said cylinder, said extension having a smaller diameter than that of said piston thereby forming an annular shoulder facing the open end of said cylinder, an annular disc member axially adjustably supported by the outer wall surface of said cylinder at its open end and surrounding said axial extension, the inner diameter of said disc member being smaller than the outer diameter of said annular shoulder whereby said disc member limits axial movement of said piston thereby regulating the volume of fluid displaced per stroke of said piston for injection into soil through a third conduit subsequently defined, an injection nozzle pointed at one end and attached at its other end to the end of said extension opposite said piston, a third conduit, heretofore mentioned, through said nozzle in communication with said second conduit, and said annular disc member having an outer diameter greater than the maximum diameter of the nozzle whereby the depth to which said nozzle can be injected into the soil is defined.

5. An injector assembly for injecting fluid into soil comprising, in combination, a cylinder having one end section closed and the other end section open, the diameter of said cylinder at its open end section being larger than at the other end section, the open and closed end sections being joined by a frusto-conical section, a piston slidably fitting said cylinder and having sections corresponding to those of the cylinder, first and second conduits through the closed end of said cylinder and through said piston, respectively, first and second check valves being positioned in said first and second conduits, respectively, in such a manner as to permit fluid flow through said first conduit only into said cylinder and through said second conduit only from said cylinder, first and second sealing means between the small diameter cylinder section and its corresponding piston section and between the larger diameter cylinder section and its corresponding piston section, respectively, an axial extension of diameter smaller than that of the larger diameter piston section on the end of the larger diameter piston section thereby providing an annular shoulder facing said extension, an annular disc member axially adjustably supported by the larger diameter cylinder section, the inner diameter of said disc member being smaller than the outer diameter of said shoulder whereby said disc member limits axial movement of said piston thereby regulating the volume of fluid displaced per stroke of said piston for injection into soil through a third conduit subsequently defined, an injection nozzle pointed at one end and attached at its other end to the end of said extension opposite said piston a compression spring surrounding said axial extension and intermediate said annular disc member and said injection nozzle, a third conduit, heretofore mentioned, through said nozzle in communication with said second conduit, and said annular disc member having an outer diameter greater than the maximum diameter of the nozzle whereby the depth to which said nozzle can be injected into the soil is defined.

References Cited in the file of this patent

UNITED STATES PATENTS

| | | |
|---|---|---|
| 944,083 | Francis | Dec. 21, 1909 |
| 1,110,182 | Blandin | Sept. 8, 1914 |
| 1,934,080 | Meyer | Nov. 7, 1933 |
| 2,069,684 | Schroeder | Feb. 2, 1937 |
| 2,573,969 | Heitzig | Nov. 6, 1951 |

FOREIGN PATENTS

| | | |
|---|---|---|
| 1,107,575 | France | Aug. 10, 1955 |